United States Patent [19]

Alt et al.

[11] Patent Number: 4,525,994
[45] Date of Patent: Jul. 2, 1985

[54] COUPLING LINK

[75] Inventors: Mark R. Alt, Chicago Heights, Ill.; John R. Olds, Schererville, Ind.

[73] Assignee: Abex Corporation, Stamford, Conn.

[21] Appl. No.: 619,863

[22] Filed: Jun. 12, 1984

[51] Int. Cl.³ .............................................. F16G 15/04
[52] U.S. Cl. ........................................ 59/85; 403/155
[58] Field of Search .................. 59/84, 85, 86, 87, 88, 59/89, 78; 403/154, 155

[56] References Cited

U.S. PATENT DOCUMENTS

| Re. 27,620 | 4/1973  | Crook, Jr. ........................ | 59/85   |
| 933,634    | 9/1909  | Dougherty et al. ............. | 403/154 |
| 1,354,953  | 10/1920 | Carmer ............................ | 403/154 |
| 1,737,915  | 12/1928 | Carrillo ........................... | 403/154 |
| 3,828,550  | 8/1974  | Fink ................................. | 59/85   |
| 3,958,411  | 5/1976  | Bernt ............................... | 59/86   |
| 4,047,471  | 9/1977  | Noack .............................. | 92/187  |
| 4,090,357  | 5/1978  | Smith ............................... | 59/85   |
| 4,106,284  | 8/1978  | Crook, Jr. ........................ | 59/83   |
| 4,107,917  | 8/1978  | Fink ................................. | 59/85   |

Primary Examiner—Daniel C. Crane
Assistant Examiner—David B. Jones
Attorney, Agent, or Firm—Mueller and Smith

[57] ABSTRACT

This invention relates to a coupling link comprising a first half line and a second half link, each comprising a unitary member with a pair of spaced ears at one end, a tongue at the other end and a central body member which joins the ears and the tongue. Bores in each of the ears of the first and second half links are aligned with a bore formed in the tongue of the opposite half link when the first and second half links are mated to form a coupling link. A link pin is received in the bores formed in the pairs of ears of the two links and in the bore in the tongue of theopposite link. Each link pin is retained in place by a pair of pin keepers each received in a slot formed in one of the ears to close the pin bore in that ear. Each pin keeper includes a tang which projects from one of the slot openings in the ear and is bent out of alignment with the slot opening to retain the keeper within the slot.

6 Claims, 3 Drawing Figures

COUPLING LINK

BACKGROUND OF THE INVENTION

This invention relates to a coupling link including first and second half links each having a pair of ears at one end and a tongue at the other end. When the two half links are assembled to form a coupling link the tongue of each link is received within the ears of the other link and retained therein by a link pin which passes through aligned bores formed in the ears and the tongue. More specifically, this invention relates to a means for maintaining the link pins within the aligned bores in the first and second half links.

A coupling link is commonly used to temporarily repair a chain which is broken as a result of a failure of a unitary cast or welded link. Such a coupling link may have a pair of U-shaped half links each having a pair of spaced ears at one end connected by a central body member to a tongue at the other end. When two half links are assembled to form a coupling link the tongue of one link is received between the ears of the other link and a retainer pin is inserted into axially aligned bores in each pair of ears and the mating tongue to join both ends of the first and second half links. The pin must be retained in position to prevent the separation of the first and second half links. Frequently, chains in which coupling links are installed are used in hostile environments such as mining and it is desirable to protect the link pin and the ear and tongue bores from exposure to dirt and mined material as much as possible in order to permit the coupling link to be easily disassembled when it is to be removed from the chain.

One means of retaining a link pin within the ear and tongue bores of a pair of half links is by welding a retainer member over the ends of each of the ear bores. The retainer member limits axial movement of the link pin and helps keep dirt out of the ear and tongue bores. A problem with this retaining means is that it requires welding equipment and a skilled welder whose services are relatively expensive. Additionally, if a chain breaks on a piece of equipment which is inaccessible to or remote from welding equipment, the chain must be removed from the machinery and transported which causes the equipment to be unusable for some period of time.

It is desirable to provide a means for retaining a link pin within the ear and tongue bores of a pair of half links which can be attached to the coupling link without special equipment and without skilled personnel. Additionally, it is desirable that the retaining means protect the ends of the link pin and the ear and tongue bores from dirt and other materials.

SUMMARY OF THE INVENTION

The instant invention provides a coupling link comprising a first half link and a second half link, each link comprising a U-shaped member with a pair of spaced ears at one end, a tongue at the other end, and a central body member which joins the ears and the tongue. Each ear is defined by a top wall, a bottom wall, a front surface and a rear surface and has a pin receiving bore which opens into the top and bottom walls and a lateral slot which opens into the front surface, the pin bore and the rear surface. The bores in the pair of ears of one of the half links are aligned with a bore formed in the tongue of the other half link when the first and second half links are mated to form a coupling link. A link pin is received in the bores formed in the pair of ears of the one link and in the bore in the tongue of the other link. The link pin is retained in place by a pin keeper which is received in each of the ear slots to close the pin bore in that ear. The pin keeper includes a tang which projects from the slot opening in one of the front or rear surfaces of the ears and is bent out of alignment with the slot opening to retain the keeper within the slot.

DESCRIPTION OF THE PREFERRED EMBODIMENT

Figure 1:
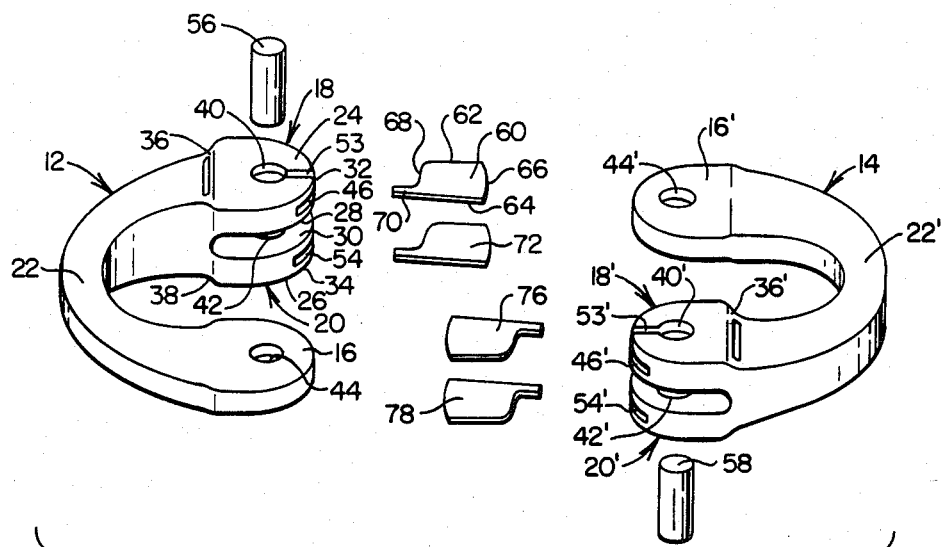
FIG. 1 is an exploded view of the elements which comprise a coupling link.
Figure 2:
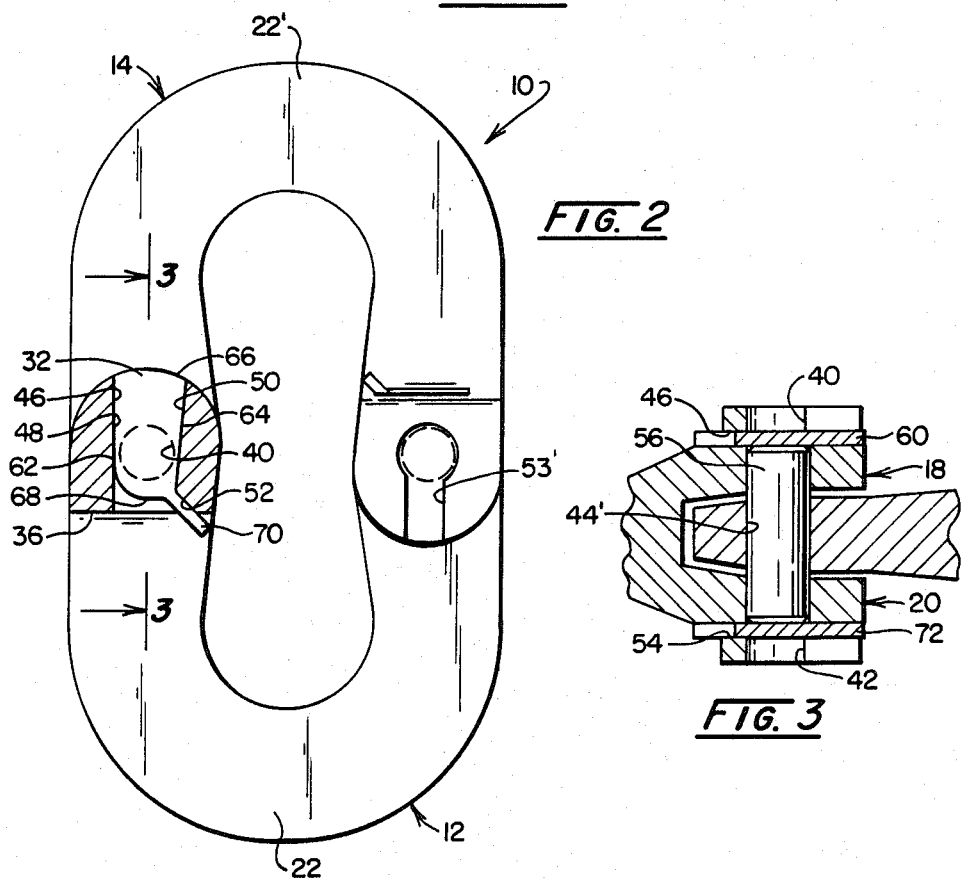
FIG. 2 is a top view of an assembled coupling link with the top portion of one ear removed to show a pin keeper.
Figure 3:
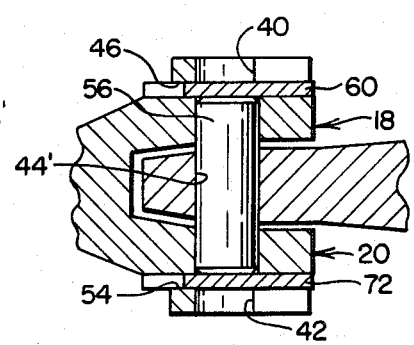
FIG. 3 is a sectional view along line 3—3 of FIG. 2.

Referring to FIGS. 1-3, a coupling link 10 has a first half link 12 and a second half link 14. The two half links, 12, 14 shown are identical but two half links having portions intermediate the ends of different shape could also be used to form a coupling link. For purposes of the instant invention, it is only important that the ends of the links be the same. Since the half links 12, 14 are identical, this description will refer to half link 12 and identical portions of second half link 14 will be identified by identical primed numbers.

Half link 12 is U-shaped and has a tongue 16 at one end which is joined to a pair of ears 18, 20 formed on the other end by a central section 22. As previously mentioned, the central section 22 of one half link 12 may or may not be the same as the central section 22' of the second half link 14. Ears 18, 20 are defined by top walls 24, 26, respectively, bottom walls 28, 30, respectively, front surfaces 32, 34, respectively, and rear surfaces 36, 38, respectively. A pin receiving bore 40, opens into the top wall 24 and the bottom wall 28 of ear 18 and a like bore 42 opens into the top wall 26 and bottom wall 30 of ear 20. A pin receiving bore 44 is also formed in tongue 16.

A lateral slot 46, the width of which is defined by walls 48, 50 is formed in ear 18 and opens into front surface 32, bore 40 and rear surface 36. Referring to FIG. 2, it can be seen that slot walls 48, 50 taper from front surface 32 to rear surface 36 which makes slot 48 wider adjacent the front surface 32 of ear 18 than it is adjacent the rear surface 36. Additionally, wall 50 has a cut out portion defined by an angled wall 52 adjacent rear surface 36 such that the slot opening where it breaks into rear surface 36 is wider than it is intermediate the front and rear surfaces 32, 36. A similar lateral slot 54 is formed in ear 20 and opens into front surface 34, lateral bore 42 and rear surface 38. Lateral slot 54 is substantially identical in size and shape to lateral slot 46. A radial slot 53 which opens into bore 40, top wall 24, lateral slot 46 and front surface 32 is formed in ear 18 and a similar radial slot, not shown, which opens into bore 42, top wall 26, lateral slot 54 and front surface 34 is formed in ear 20. These slots 53 permit access to lateral slots 46, 54 for clean out purposes.

When first and second half links 12, 14 are assembled to form coupling link 10, tongue 16' of link 14 is received between ears 18, 20 of link 12 such that the pin bores 40, 42 in the ears 18, 20 are axially aligned with the pin bore 44' in the tongue 16' and tongue 16 of link 12 is received between ears 18', 20' of half link 14 such that the pin bores 40', 42' in the ears 18', 20' are aligned with the pin bore 44 in tongue 16. A link pin 56 shorter than the distance between slots 46, 54 is inserted in bores 40, 44' and 42 between slots 46, 54 to secure tongue 16' of half link 14 between ears 18, 20 of half link 12 and a link pin 58 is inserted in bores 40', 44 and 42' between slots 46', 54' to secure tongue 16 of link 12 between ears 18' and 20' of half link 14.

In order to keep link pin 56 between slots 46, 54 a pin keeper 60 defined in part by side walls 62, 64 a front wall 66 and a rear wall 68 is inserted in lateral slot 46 to close bore 40 adjacent one end of the pin 56. Side walls 62, 64 of pin keeper 60 taper between front wall 66 and rear wall 68 such that front wall 66 is wider than rear wall 68. A tang 70 which is aligned with side wall 64 prior to insertion of pin keeper 60 in slot 46 projects from rear wall 68. Pin keeper 60 is inserted in slot 46 through the opening in front surface 32 and is pushed rearwardly until side walls 62, 64 engage slot walls 48, 50. Further rearward movement of pin keeper 60 is prevented because of the tapered slot. When pin keeper 60 is completely inserted in slot 46, tang 70 projects through the opening in rear surface 36. Subsequently, tang 70 is laterally offset by any convenient means such as striking it with a hammer to engage wall 52 which defines a cut-out portion of slot 46 adjacent rear surface 36. When tang 70 is laterally offset the width of pin keeper 60 is increased beyond the minimum width of slot 46 and pin keeper 60 can not move axially for removal from the slot 46. An identical pin keeper 72 having a tang 74 is inserted in slot 54 of ear 20 to cover 42 adjacent the opposite end of link pin 56. Identical pin keepers 76, 78 are also inserted in slots 46', 54', respectively, of ears 18', 20' to maintain link pin 58 between slots 46', 54'.

In order to disassemble coupling link 10, the pin keepers 60, 72, 76, 78 must be removed from the lateral slots 46, 54, 44', 54', respectively. In order to enable the pin keeper 60 to be removed from the slots their tangs must be moved laterally away from the slot walls toward their center lines to enable them to pass through the narrowest portion of their slots. Again, the tang can be moved by any convenient means such as being pounded by hammer.

From the above it is seen that the link pin retaining means of the instant invention is a simple, mechanical device which does not require special equipment or skilled personnel and protects the ends of the link pin and the ear and tongue bores from dirt and other material.

Since certain changes may be made in the above apparatus without departing from the scope of the invention herein involved, it is intended that all matter contained in the above description or shown in the accompanying drawings shall be interpreted as illustrative and no in a limiting sense.

We claim:

1. A coupling link comprising:
a first half link and a second half link each link comprising a unitary member with a pair of spaced ears at one end, a tongue at the other end and a central body member which joins the ears and the tongue, each ear defined by a top wall, a bottom wall, a front surface and a rear surface, a pin receiving bore formed in each ear which opens into the top and bottom walls, a lateral slot formed in each ear which opens into the front surface, the pin bore and the rear surface between the top and bottom walls, wherein the bores formed in the pair of ears of one of the first or second half links are aligned with the bore formed in the tongue of the other of the first or second half links and the bores formed in the ears of the other of the first or second half links are aligned with the bore formed in the tongue of the one of the first or second half links so that the first and second half links mated with one another to form the coupling link, a pair of link pins, one of which is received in the bores formed in the pair of ears of the one of the first or second half links and the bore in the tongue of the other of the first or second half link and the other of which is received in the bores formed in the pair of ears of the other of the first and second half links and the bore in the tongue of one of the first or second half links, the length of each link pin being less than the distance between the slots in a pair of ears, the first link pin being positioned between the slots in the pair of ears in which it is received and the second link pin being positioned between the slots in the pair of ears in which it is received, a plurality of pin keepers one of which is received in each ear slot to close the pin bore in that ear to keep each of the link pins positioned between the slots in the pair of ears in which it is received, and each pin keeper includes a tang, movable relative to the pin keeper, which projects through the slot opening in one of the front or rear surfaces of ears and the tang is moved out of alignment with the one slot opening to retain the keeper within the ear slot.

2. The coupling link of claim 1, wherein each lateral slot is defined by a pair of non parallel walls such that the slot opening in one of the front or rear surfaces of the ear is narrower than the slot opening in the other of the front or rear surfaces.

3. The coupling link of claim 2, wherein each pin keeper is defined by a pair of tapered walls which complement the non parallel walls of a lateral slot when a pin keeper is inserted therein.

4. The coupling link of claim 3, wherein one of the non parallel walls which defines a slot intersects any angled wall which defines a cut out portion which opens into the front or rear ear surface which contain the narrower slot opening.

5. The coupling link of claim 4, wherein the tang of a pin keeper is moved into contact with the angled wall to cause the tapered pin keeper walls to firmly engage the non parallel slot walls and retain the pin keeper within the slot.

6. The coupling link of claim 2, including a radial clean out slot formed in each ear which opens into the pin bore, the top wall, the lateral slot and the front surface.

* * * * *